G. B. SOLEY.
HAND TOOL FOR CARVING AND ENGRAVING.
No. 112,860. Patented Mar. 21, 1871.
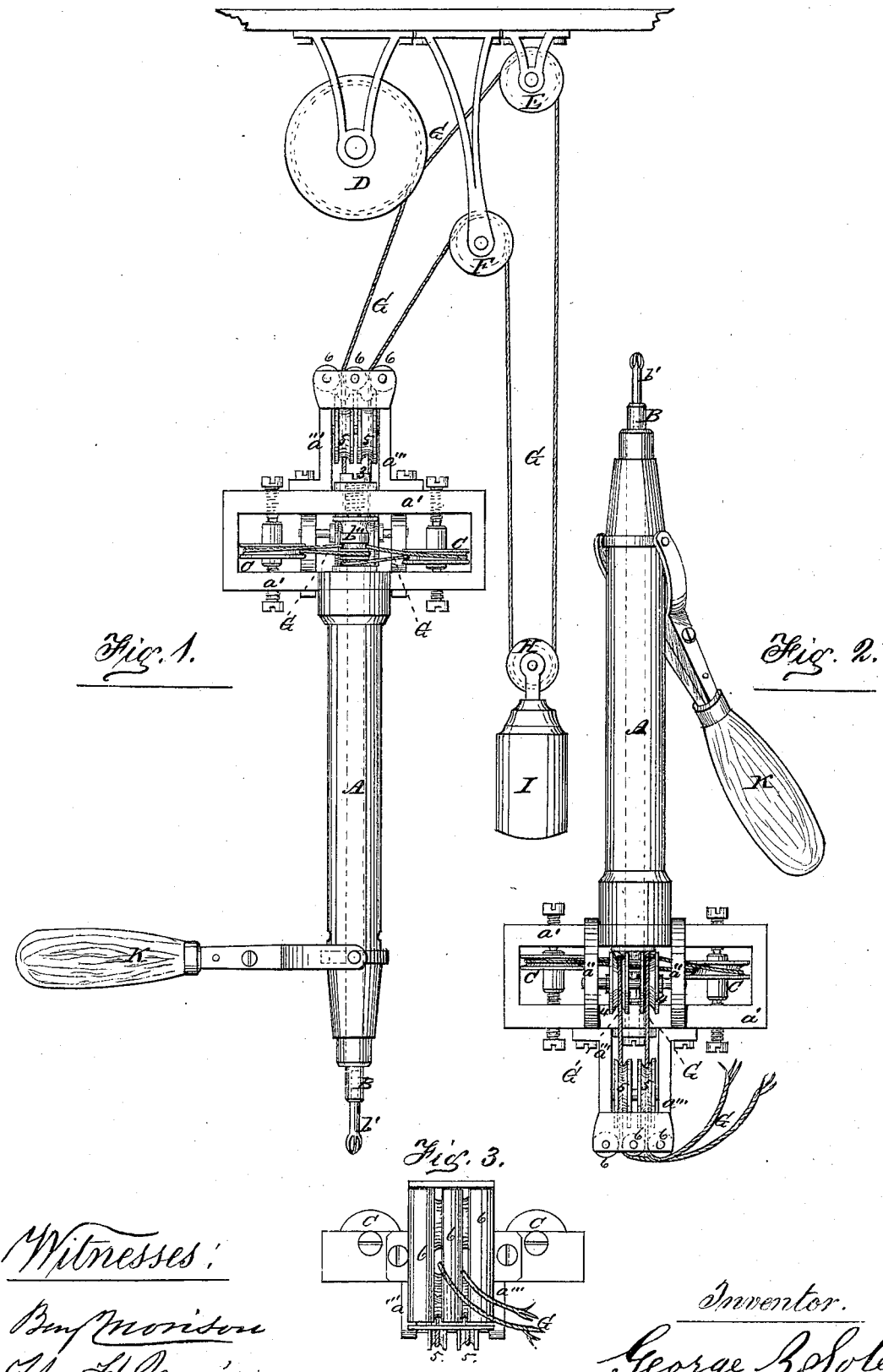

United States Patent Office.

GEORGE B. SOLEY, OF PHILADELPHIA, PENNSYLVANIA.

Letters Patent No. 112,860, dated March 21, 1871.

IMPROVEMENT IN HAND-TOOLS FOR CARVING AND ENGRAVING.

The Schedule referred to in these Letters Patent and making part of the same.

I, GEORGE B. SOLEY, of the city of Philadelphia, in the State of Pennsylvania, have invented certain Improvements in Hand-Implements for Carving and Engraving, of which the following is a specification.

Nature and Objects of the Invention.

My invention relates to the construction of the stem of a hand-implement for carving and engraving, consisting of a case containing a rotary spindle having any suitable cutting or drilling-head projecting at its free end, a conical bearing and three or more pulley-cord grooves around at its upper end, and rotated by means of suitable pulleys and an endless cord with a take-up weight in connection with any suitable driving-pulley, so that the implement can be freely and easily held and guided in its work in any position or direction in relation to the plate or block to be operated upon that the engraver or carver may desire; the object of my invention being to afford a hand-tool or implement for engravers and carvers, which, operating automatically in cutting, engraving, and routing, will require only to be applied to and guided upon the parts to be so carved, engraved, or routed.

Description of the Accompanying Drawing.

Figure 1 is a side elevation of the implement, with its cutting-end downward and its opposite end in connection with the weighted endless cord and the driving-pulley.

Figure 2 is a representation of the opposite side of the said implement shown in fig. 1, but in a reversed vertical position, and without the driving-pulley and the take-up weight shown in the said figure.

Figure 3 is a plan view of the gear-end of the implement.

General Description.

The stem A is a hollow cylinder, which is permanently fixed by one of its ends to an open frame, $a'$.

The spindle B fits in the hollow stem A, so that it can be rotated easily and steadily therein, its head or cutter-end projecting from the free end of A, and being fitted with any suitable cutter, $b'$, its opposite end passing tightly through a grooved collar, $b''$, in the frame $a'$, and has a conical cavity in that end which receives the pointed end of a screw, 3, which thus forms its bearing-point during the operation of the cutter $b'$.

On each of two opposite sides of the grooved collar $b''$ there is a grooved pulley, C, arranged in the frame $a'$ to rotate in planes parallel with the planes of the grooves in the collar $b''$.

Attached firmly to the edges of one side of the frame $a'$ there are two projecting legs, $a''$ $a''$, which support the axis of two distinct and independently-rotating grooved leading pulleys, 4 4, and to that side of the frame $a'$ which is opposite to the side from which the stem A projects there is permanently fixed a supplementary frame, $a'''$, which supports the axes of two pairs of opposite, distinct, and independently-rotating grooved leading pulleys, 5 5 5 5, in planes corresponding with the planes of rotation of the leading pulleys 4 4.

At right angles to the planes of rotation of the leading pulleys 5 5 5 5, and distinct or separated at a short distance from the latter, the said supplementary frame $a'''$ supports three friction-rollers, 6 6 6, with open spaces between them, (see fig. 3.)

Overhead in the operator's room there are three grooved pulleys, D E F, attached to rotate in parallel vertical planes, the larger one, D, being the driver, which the endless cord G is caused to completely encircle by the relative position of the pulley E, and from over which latter the cord G descends vertically and passes under the pulley H of the take-up weight I, so as to suspend the latter; and thence vertically upward and over the pulley F, from whence the said cord G extends downward freely in the space between two of the friction-rollers 6 6, and out under one of the leading pulleys 5; thence over one of the leading pulleys 4 to and partly around in one of the grooves in collar $b''$ of the spindle B, to and around one of the grooved pulleys C, and then back to and partly around in another groove in the collar $b''$, from which it passes partly around the other grooved pulley C to another or third groove in the said collar $b''$; thence outward over the other one of the leading grooved pulleys 4 to and under the other leading grooved pulley 5, out through the other space between two of the friction-rollers 6 6 to the driving-pulley D, from which it started, and so on continuously, giving rapid rotary motion to the spindle $b'$.

A small handle, K, if desired, may be articulated to the stem A, as shown in figs. 1 and 2, for the purpose of enabling the operator to more firmly and steadily guide and control the different positions required in the use of the implement.

It will be understood without further description that the required cutter at the projecting end of the spindle B is to be applied and guided in contact with the surface of the plate or block to be engraved or carved; that the rapid rotary motion which will be given to the said spindle by the running endless cord G and the overhead driving-pulley D will cause a very rapid cutting away of the parts required to be removed in the operation of engraving, carving, or routing; that the endless cord G, being of any required length, will be kept at a uniform tension by the gravitation of the take-up weight I; that the implement can be readily applied and operated with its cutter either in the downward vertical direction shown in fig. 1, or in the upward vertical direction shown in fig. 2, or in any inclined direction that may be desired; that the small attached handle K will give the operator a perfect command of the implement in whatever position the work to be done may require it to be held; and that the cutting or excavating action of the implement being automatic and rapid, the operator has only to apply, direct, and guide it, to engrave, carve, or rout with perfect facility.

Claims.

I claim as my invention—

1. The hand-stem, consisting of the case A, the open frame $a'$, the rotary spindle B with the conical cavity in its upper end for the bearing-screw 3, and the fixed collar $b''$ provided with the pulley-cord grooves around it, all constructed and arranged together substantially as and for the purpose hereinbefore set forth and described.

2. In combination with a hand-implement, constructed and arranged for engraving, carving, and routing, substantially as hereinbefore described, the endless cord G, take-up weight I, and pulleys D E F, arranged to operate together substantially as and for the purpose hereinbefore set forth and described.

GEORGE B. SOLEY.

Witnesses:
BENJ. MORISON,
WM. H. MORISON.